(12) United States Patent
Nishiguchi

(10) Patent No.: US 11,443,333 B2
(45) Date of Patent: Sep. 13, 2022

(54) MARKETING SUPPORT SYSTEM, MARKETING SUPPORT METHOD AND PROGRAM

(71) Applicant: Strategy Partners Co., Ltd., Minato-ku (JP)

(72) Inventor: Kazuki Nishiguchi, Minato-ku (JP)

(73) Assignee: STRATEGY PARTNERS CO., LTD., Minato-Ku (JP)

( * ) Notice: Subject to any disclaimer, the term of this patent is extended or adjusted under 35 U.S.C. 154(b) by 52 days.

(21) Appl. No.: 16/593,792

(22) Filed: Oct. 4, 2019

(65) Prior Publication Data

US 2020/0294070 A1    Sep. 17, 2020

(30) Foreign Application Priority Data

Mar. 12, 2019 (JP) .............................. JP2019-044666

(51) Int. Cl.
*G06Q 30/00* (2012.01)
*G06Q 30/02* (2012.01)

(52) U.S. Cl.
CPC ..... *G06Q 30/0204* (2013.01); *G06Q 30/0245* (2013.01)

(58) Field of Classification Search
CPC ................. G06Q 30/0204; G06Q 30/0245
See application file for complete search history.

(56) References Cited

U.S. PATENT DOCUMENTS 7,917,388 B2 * 3/2011 van der Riet ...... G06Q 30/0269
705/14.25

2007/0156515 A1 * 7/2007 Hasselback ........ G06Q 30/0226
705/14.27

(Continued)

FOREIGN PATENT DOCUMENTS

| JP | 2008521143 A | 6/2008 |
| WO | WO2006055887 A2 | 5/2006 |
| WO | WO-2009042254 A2 * | 4/2009 ........... G06Q 10/063 |

OTHER PUBLICATIONS

Kithinji, Internet Marketing and Performance of Small and Medium Enterprises in Nairobi County, A Research Project Presented in Partial Fulfillment of The Requirement For The Award of The Degree of Master of Business Administration, Shool of Business, University of Nairobi, 2014 (Year: 2014).*

*Primary Examiner* — Patricia H Munson
*Assistant Examiner* — Uche Byrd

(57) ABSTRACT

A marketing support system includes an acquisition unit acquiring questionnaire information including a response result of a questionnaire and an attribute of a respondent of the questionnaire, the questionnaire conducted to consumers in a product and service field to which a marketing target belongs, regarding recognition, usage experience and frequency of use of a brand belonging to the field, an assignment unit for assigning the respondent to any one of a plurality of segments set in advance based on the response result, an aggregation unit configured to estimate the number of consumers and the ratio of the number of consumers with respect to all the segments based on the number of respondents assigned to each of the plurality of segments, and an output unit configured to display a policy for respective consumers of the plurality of segments and information on costs for the policy for comparison among different segments.

2 Claims, 13 Drawing Sheets

(56) References Cited

U.S. PATENT DOCUMENTS

| | | | | |
|---|---|---|---|---|
| 2008/0288331 A1* | 11/2008 | Magids | .............. | G06Q 30/0203 |
| | | | | 705/7.32 |
| 2009/0222303 A1* | 9/2009 | Higgins | ................ | G06Q 50/01 |
| | | | | 705/14.16 |
| 2014/0136606 A1* | 5/2014 | Roundtree | ............ | H04L 67/306 |
| | | | | 709/203 |

* cited by examiner

FIG. 8A

| | Further loyalization policy | Loyalization policy | Retargeting to customers with purchase experiences | Retargeting to non-purchasers with recognitions | Mass advertisement | PR |
|---|---|---|---|---|---|---|
| Loyal | ■ | | | | ■ | ■ |
| General | | ■ | | | ■ | ■ |
| Departed | | | ■ | | ■ | ■ |
| Recognizes and never-purchased the brand | | | | ■ | ■ | ■ |
| Does not recognize the brand | | | | | ■ | ■ |

FIG. 8B

| | ★ Ratio for target market parameter | Further loyalization policy | Loyalization policy | Retargeting to customers with purchase experiences | Retargeting to non-purchasers with recognitions | Mass advertisement | PR | ★ Total Amount |
|---|---|---|---|---|---|---|---|---|
| ★ Cost | | ¥A | ¥B | ¥C | ¥D | ¥E | ¥F | |
| Loyal | 1% | ①  | | | | | | |
| General | 3% | | | | | ② | | ④ |
| Departed | 6% | | | | | | | |
| Recognizes and never purchased the brand | 30% | | | | | | | |
| Does not recognize the brand | 60% | | | | | ③ | | ⑤ |

FIG. 9

| N=1000 | | Competitor's brand A | | | | | |
|---|---|---|---|---|---|---|---|
| | | Total | Loyal | General | Departed | Customer who recognizes the brand and never purchased the brand | Customer who does not recognize the brand |
| Own brand | Total | 1000 | 30 | 50 | 20 | 200 | 700 |
| | Loyal | 50 | 3 | 5 | 2 | 10 | 30 |
| | General | 100 | 5 | 10 | 5 | 10 | 70 |
| | Departed | 50 | 2 | 5 | 3 | 10 | 30 |
| | Customer who recognizes the brand and never purchased the brand | 300 | 15 | 20 | 5 | 40 | 220 |
| | Customer who does not recognize the brand | 500 | 5 | 10 | 5 | 110 | 380 |

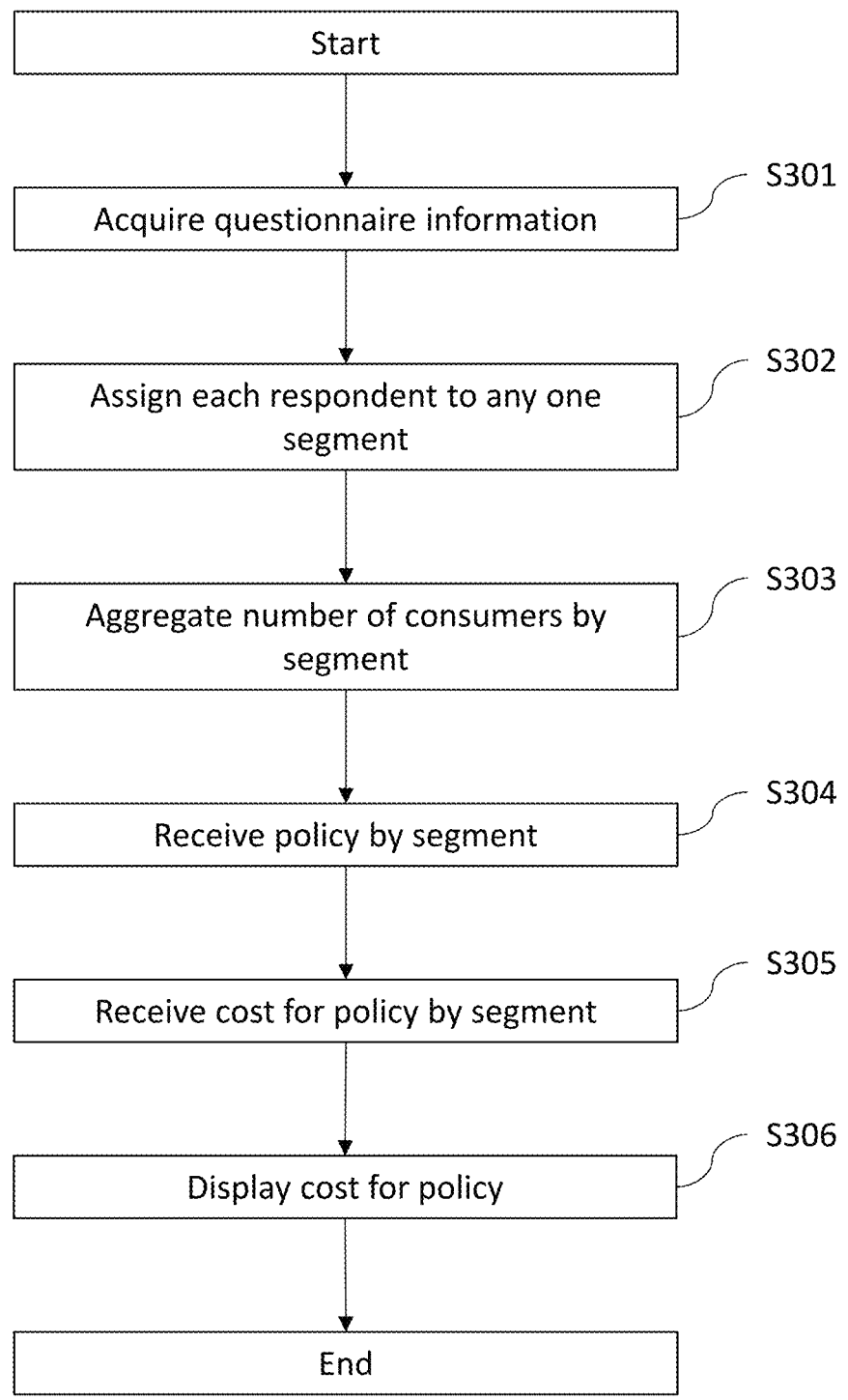

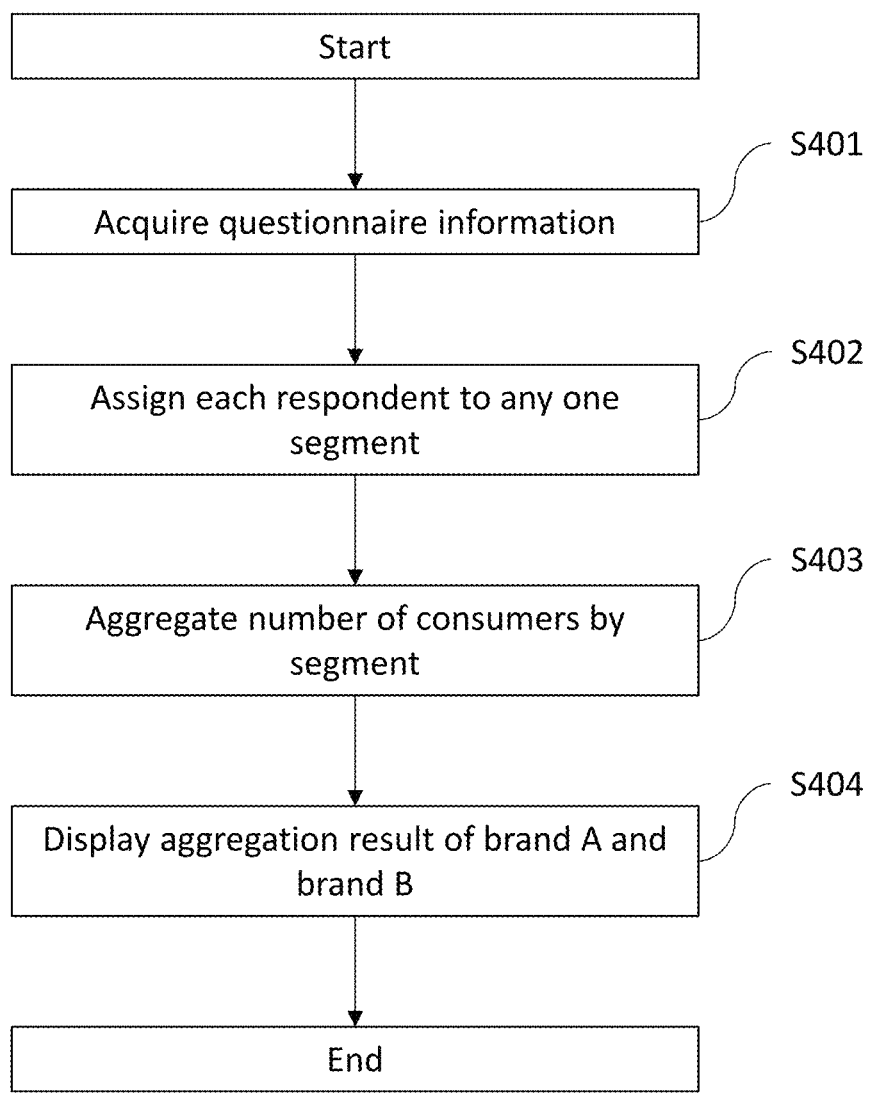

MARKETING SUPPORT SYSTEM, MARKETING SUPPORT METHOD AND PROGRAM

CROSS REFERENCE

The present application claims priority under 35 U.S.C § 119(a) to Japanese application number, 2019-044666, filed on Mar. 12, 2019 in the Japanese Intellectual Property Office, which is incorporated herein by reference in its entirety.

TECHNICAL FIELD

The present invention relates to a marketing support system, a marketing support method and program.

BACKGROUND ART

For example, the following Patent Document 1 discloses a method for creating a product offer of a retailer and notifying it to a consumer. This method is a method of combining a loyalty of a store or retailer and a loyalty of a product to identify specific consumers and consumer groups to sell.

PRIOR ART LITERATURE

Patent Document

[Patent Document 1] Japanese Patent Publication No. 2008-521143

DESCRIPTION OF THE INVENTION

Technical Problem

For an effective marketing activity, it is important to have an appropriate approach targeted to a customer segment. For example, expanding an approach for a specific segment to other segments is not appropriate as a marketing strategy.

However, the development of an approach according to a customer segment and segment analysis as its premise is not easy and takes time.

The present invention has been made in view of such background, and is directed to provide a tool that can easily carry out segment analysis for appropriate marketing activities.

Technical Solution

The main invention of the present invention for solving the above problems is provided with, a marketing support system including, an acquisition unit acquiring questionnaire information including a response result of a questionnaire and an attribute of a respondent of the questionnaire, the questionnaire conducted to consumers in a product and service field to which a marketing target belongs, regarding recognition, usage experience and frequency of use of a brand belonging to the field, an assignment unit for assigning the respondent to any one of a plurality of segments set in advance based on the response result, an aggregation unit configured to estimate the number of consumers and the ratio of the number of consumers with respect to all the segments based on the number of respondents assigned to each of the plurality of segments, and an output unit configured to display a policy for consumers of each of the plurality of segments and information on costs for the policy for comparison among different segments.

Other problems and solutions disclosed in the present application will be made clear by the section of the embodiments of the present invention and the accompanying drawings.

Advantageous Effects

According to the present invention, segment analysis can be easily performed. Therefore, it is possible to facilitate creating a hypothesis and support effective marketing activities.

DESCRIPTION OF THE DRAWINGS

FIGS. 8A and 8B show examples of a screen displaying expenses for each customer segment.

FIG. 9 shows an example of an overlap analysis screen of customer segments of one's own brand and a competitor brand.

FIG. 11 describes a process according to a policy plan of a marketing support system 20.

FIG. 12 describes a process according to a competitiveness analysis of a marketing support system 20.

MODE FOR CARRYING OUT THE INVENTION

Hereinafter, a marketing support system according to an embodiment of the present invention will be described with reference to the accompanying drawings. However, the present invention is not limited thereto.

An example of an overall configuration of a system in the present embodiment will be described.

Figure 1:
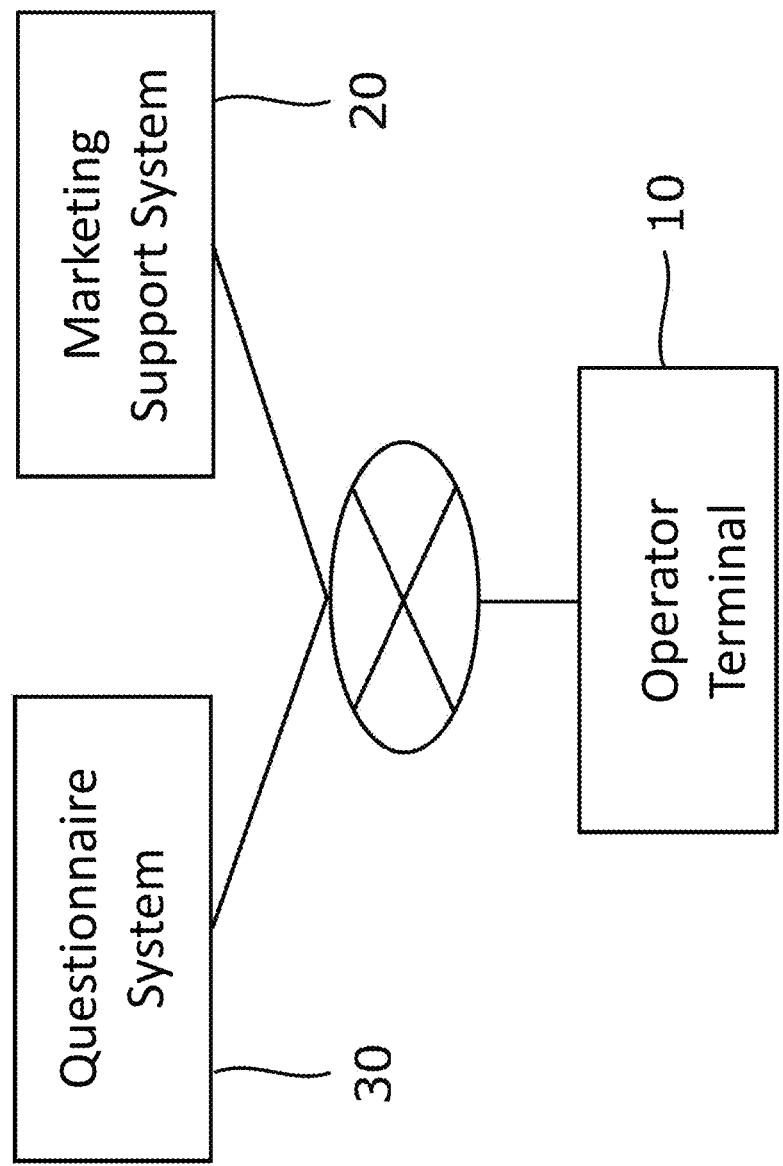
FIG. 1 is a diagram illustrating an example of an overall configuration of a system including a user terminal 10, a marketing support system 20, and a questionnaire system 30 in the present embodiment.

FIG. 1 is a diagram illustrating an example of an overall configuration of a system including an operator terminal 10, a marketing support system 20, and a questionnaire system 30 in the present embodiment. The operator terminal 10 and the questionnaire system 30 are communicably connected to the marketing support system 20 respectively in a wired or wireless manner.

In the present embodiment, it is assumed that the operator terminal 10, the marketing support system 20, and the questionnaire system 30 are independent of each other. However, the operator terminal 10 may include the marketing support system 20, and the marketing support system 20 may include the questionnaire system 30.

The operator terminal 10 is, for example, a computer used by a person (operator) who performs marketing activities, and may be configured as one or more computers. Here, marketing activities include the entire process of establishment, implementation, evaluation and improvement of marketing plans.

The operator terminal 10 receives an analysis result from the marketing support system 20 and displays the same. Here, the term "display" refers generally to an output of information such as displaying on a display, printing by a printer, and the like.

Next, the marketing support system 20 is one or more computers that support marketing activities by an operator. The specific configuration and operation of the marketing support system 20 will be described later.

The questionnaire system 30 is a computer that provides the marketing support system 20 with questionnaire information, and is, for example, a server of a research company, an advertising company, or an operator. Here, the questionnaire information is a base material of segment analysis by the marketing support system 20, and, for example, a question included in the questionnaire, a response of a respondent responding to the question, and information indicating an attribute of the respondent (attribute information). The questionnaire information is collected and accumulated at predetermined time intervals (for example, one month, six months, one year, etc.).

Figure 4:
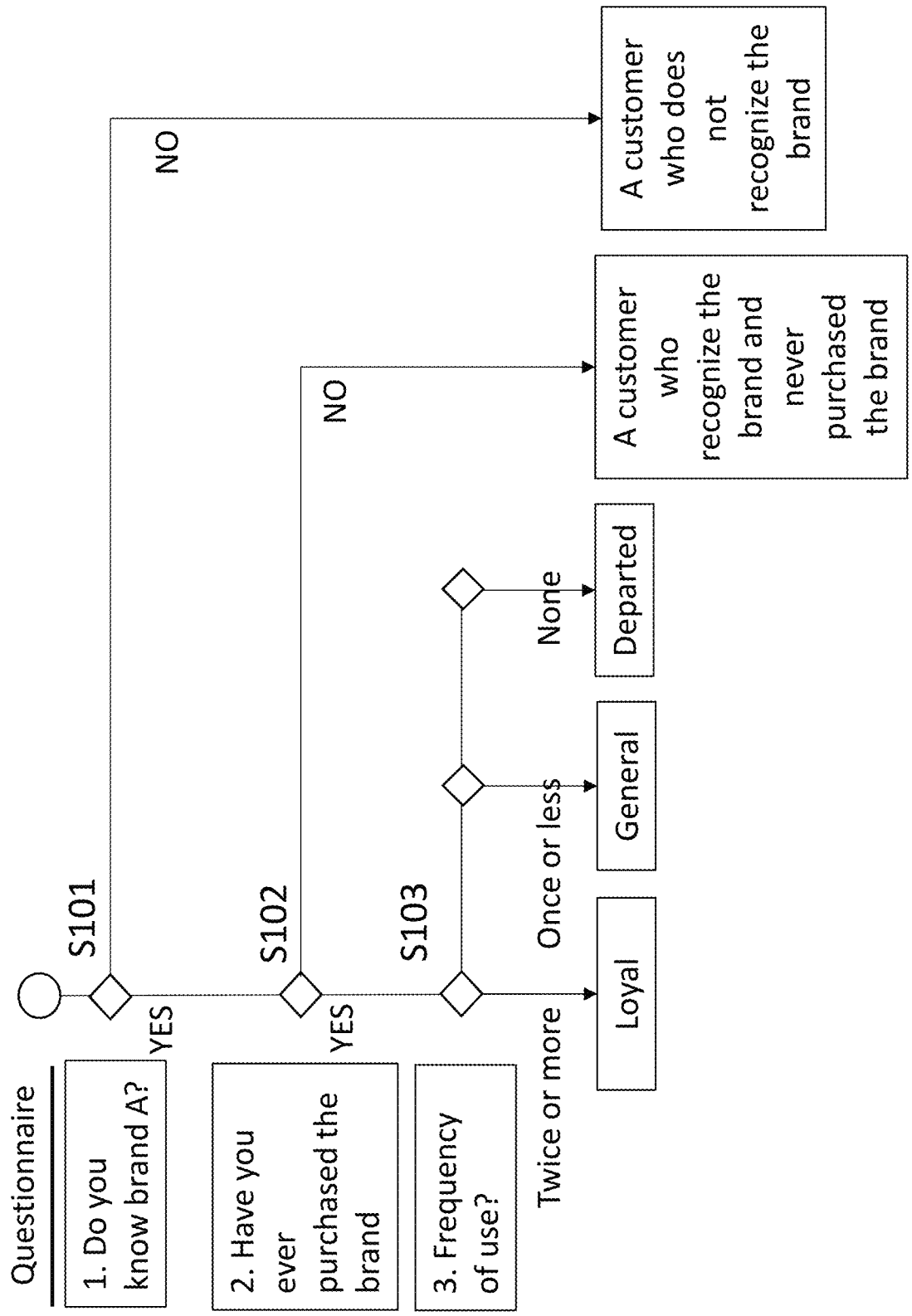
FIG. 4 is a diagram illustrating an example of a customer segment classification method.

Here, for example, the number of segments is preset to five or nine. Specifically, as shown in FIG. 4, customers may be classified into five segments of a loyal customer, a general customer, a departed customer, a customer who recognizes the brand and never purchased the brand, and a customer who does not recognize the brand according to the customer experience such as whether a specific brand is recognized or not, frequency of purchase (use) of the brand, whether the brand is continuously purchased (used) or not, and frequency of use and so on. Alternatively, as shown in FIG. 5, according to whether there is a purchase intention of the brand (brand preference) (high or low) and the high or low frequency and whether there is a current purchase (use), four segments of a loyal customer, a general customer, a departed customer, and a customer who recognizes the brand and never purchased the brand may be divided into two, and together with a customer who does not recognize the brand may form a total of nine segments, and either or both classification methods may be used.

In the present embodiment, the response results of the questionnaire are used to distribute the respondents of the questionnaire into five segments or nine segments. The questionnaire asks about a specific brand and/or multiple brands that belong to product A (including service) to be marketed. Here, as the product A, there are, for example, automobiles, cosmetics, internet news sites, and so on. Further, as a brand, there are, for example, Toyota (trademark), Nissan (trademark), Honda (trademark) and so on in the case of automobiles.

As an example of a question in the questionnaire, as shown in FIG. 4, the respondent is asked about whether a specific brand is recognized or not, whether the brand was purchased or not, and the frequency of purchase. These questions ask the respondent about a customer experience, and based on the responses to these questions, each respondent is assigned to one of five segments.

Figure 5:
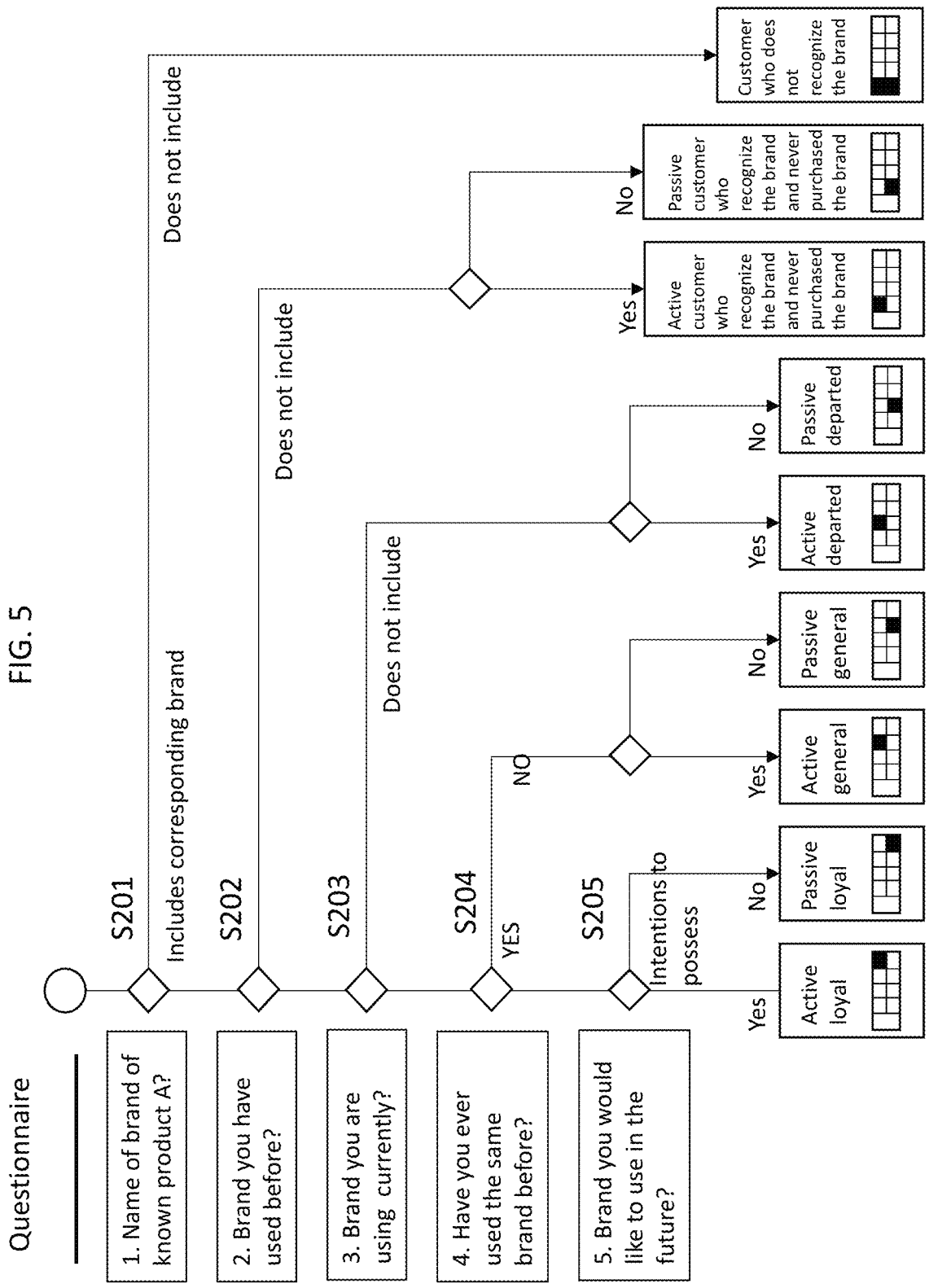
FIG. 5 is a diagram illustrating another example of a customer segment classification method.

Also, as shown in FIG. 5, the questionnaire asks the respondent whether a specific brand is recognized or not, whether the brand was purchased or not, the frequency thereof, and among one's own brand or competitor brand in product category, which brand the respondent wants to purchase/use next time also. Thereby, it is possible to confirm the willingness of respondents to use specific brands. Thus, for example, the respondent can be assigned to any one of the nine segments.

Further, the questionnaire asks the respondent to provide attribute information. The attribute information may include, for example, demographic attributes such as age group, gender, place of residence, family members, occupation, income, and so on as well as psychological attributes, geographical attributes and behavioral attributes. As psychological attributes, geographical attributes, and behavioral attributes, there is for example, how a certain brand was known, a reason for liking a certain brand, an impression of a certain brand, a media habit of a respondent, an evaluation on a certain product and so on.

Here, it is the role of the marketing support system 20 to assign respondents to segments, but for convenience of description, it is mentioned here. For example, as shown in FIG. 4, the questionnaire system 30 first asks the respondent whether he or she knows about a specific brand (for example, brand A) in S101. If the response of the respondent to the question is YES, the process proceeds to S102. If the response is NO, the marketing support system 20 classifies the respondent as 5) a customer who does not recognize the brand.

In S102, the questionnaire system 30 asks the respondent whether he or she has ever purchased brand A. If the response of the respondent to the question is YES, the process proceeds to S103. If the response is NO, the marketing support system 20 acquires the questionnaire result from the questionnaire system 30, and classifies the respondent as 4) a customer who recognizes the brand and never purchased the brand.

In S103, the questionnaire system 30 asks the respondent about the frequency of purchase (use) of the product of brand A. If the response of the respondent to the question is that the purchase frequency of the product is twice or more a year, the marketing support system 20 acquires the questionnaire result from the questionnaire system 30, and classifies the respondent as 1) a loyal customer. The respondent is classified as 2) a general customer if the purchase frequency is once or less a year, and 3) a departed customer if the product is not purchased now. Here, the standard of frequency can be set appropriately according to the nature of the product or service.

In addition, as shown in FIG. 5, first, the marketing support system 20 determines whether the marketing target brand is included or not in the response result obtained in response to the question of selecting a brand of a known product A that the questionnaire system 30 provided to the respondent, in S201. In the case where the target brand is not included in the response result, the marketing support system 20 assigns the corresponding respondent to the segment of a customer who does not recognize the brand. On the other hand, if the marketing target is included in the response to the question of the known brand, the marketing support system 20 determines whether the marketing target is included in the response to the question of a brand that has been used, in S202.

Then, if the marketing target is not included in the response to the question provided by the questionnaire system 30 to the respondent of a brand that has been used, the marketing support system 20 places the respondent in a position as a customer who recognized the brand and never purchase the brand. At the same time, depending on whether the marketing target is included in the response to the question of the brand wanted for use in the future, the marketing support system 20 assigns the respondent to an active customer who recognizes the brand and never purchased the brand or a passive customer who recognizes the brand and never purchased the brand among nine segments. On the other hand, if the marketing target is included in the response to the question on the brand that has been used, the marketing support system 20 determines whether the target brand is included in the response to the question on the brand currently being used, in S203.

Next, if the marketing target is not included in the response to the question of the brand currently being used, provided by the questionnaire system 30 to the respondent, the marketing support system 20 places the respondent in a position as a departed customer. At the same time, the marketing support system 20 assigns the respondent to an active departed customer or a passive departed customer depending on whether the marketing target is included in the response to the question of the brand wanted for use in the future. On the other hand, if the marketing target is included in the response to the question of the brand currently being used, the marketing support system 20 determines whether the marketing target was used in the past, in S204.

Then, if the respondent has never used the marketing target in the past, the marketing support system places the respondent in a position as a general customer. At the same time, the marketing support system 20 assigns the respondent to an active general customer or a passive general customer depending on whether the marketing target is included in the response to the question of the brand wanted for use in the future.

In addition, if there is a past use of the marketing target, the marketing support system 20 assigns the respondent to an active loyal customer or a passive loyal customer depending on whether the marketing target is included in the response to the question of the brand wanted for use in the future, in S205. Questionnaire respondents may be assigned to any one segment in this way. Here, for the questionnaire, other contents can be considered, for example, it is also possible to inquire about a specific brand starting from the first step, and it is possible to select the response from a specific brand and a competitor brand for the question of the brand wanted for use in the future.

Figure 2:
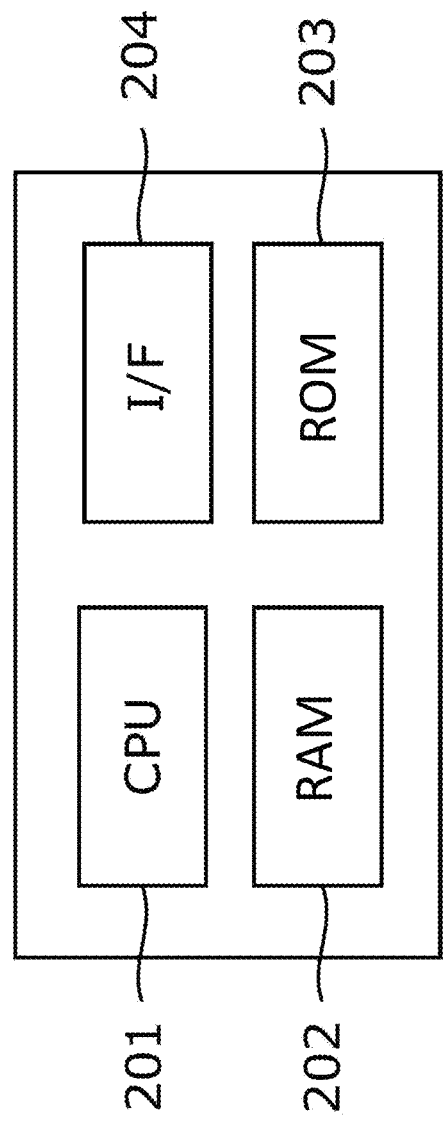
FIG. 2 is a diagram illustrating an example of a hardware configuration of a computer used as a marketing support system 20.

Next, the configuration of the marketing support system 20 will be described in detail. FIG. 2 is a diagram illustrating an example of a hardware configuration of a computer used as the marketing support system 20. The marketing support system 20 is configured to have a CPU 201, a memory 202, a storage device 203, and a communication interface 204.

The CPU 201 realizes various functions of the marketing support system 20 mentioned later by reading various programs in the memory 202 and executing the programs. The storage device 203 is, for example, a hard disk drive, a solid state drive, a flash memory, or the like which stores various data and programs.

The communication interface 204 is an interface for connecting to a communication network, and for example, is an adapter for connecting to Ethernet (registered trademark), a modem for connecting to a public telephone network, a wireless communication device for performing wireless communication, a universal serial bus (USB) connector or RS232C connector for serial communication.

Further, the marketing support system 20 may include an input device (not shown), for example, a keyboard, a mouse, a touch panel, a button, a microphone and the like, and may include an output device (not shown) which outputs data, for example, a display, a printer, a speaker and the like.

Figure 3:
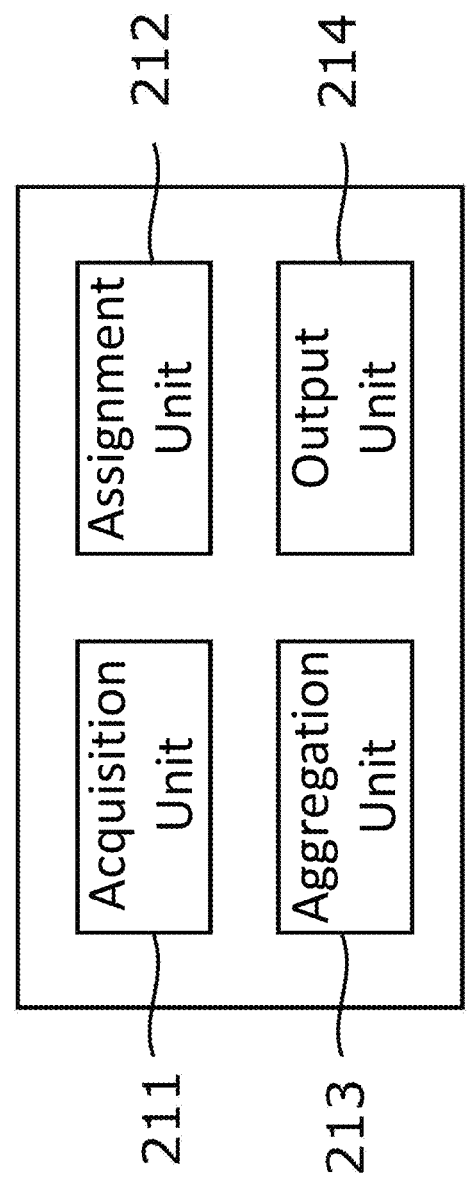
FIG. 3 is a diagram illustrating an example of a software configuration of a marketing support system 20.

FIG. 3 is a diagram illustrating an example of a software configuration of the marketing support system 20. The marketing support system 20 includes functional units of an acquisition unit 211, an assignment unit 212, an aggregation unit 213, and an output unit 214.

The acquisition unit 211 acquires response information that shows the response results of the questionnaire, and attribute information that shows an attribute of each respondent, from the questionnaire system 30. The response information and the attribute information are described in detail above.

The assignment unit 212 assigns each respondent to any one of a plurality of segments set in advance, based on the response information. The procedure of assignment to segments is described in detail above in relation to FIGS. 4 and 5.

The aggregation unit 213 aggregates the attributes of the respondents assigned to a corresponding segment for each segment. Here, the aggregation of attribute information can be performed based on a response rate described below.

Figure 6:
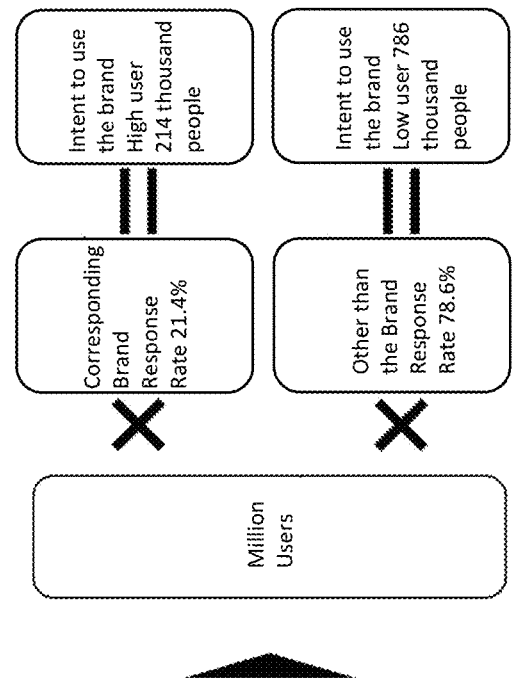
FIG. 6 is a diagram illustrating an example of a method of calculating the number of customers by segment.

Explaining the response rate using the example of FIG. 6, in a certain questionnaire, respondents A to E select a brand with intentions to use among the brands of product A including brands A to D and the marketing target ("corresponding brand" of FIG. 6). Here, the respondent may select a plurality of brands. In this case, the response rate of the corresponding brand is indicated by the ratio of the total number of selections of the corresponding brand 3 to the total of 14 selections in the entire questionnaire, and is 21.4% in the example of FIG. 6.

In addition, by using statistical information, it is possible to calculate the number of users who have a high intention to use the corresponding brand. For example, if there is a statistic that there are 1 million users of product A, the number of users who intend to use the brand can be calculated as 214,000, which is 1 million people multiplied by 21.4%. Alternatively, the number of respondents can be calculated based on survey parameters and the population estimate announced by the Ministry of Internal Affairs and Communications.

In this way, it is possible to calculate, for each segment, the ratio and number of users having a specific attribute (e.g., age group; male, female; occupation and so on) among the users belonging to that segment.

Then, as shown in FIGS. 7 to 10, the output unit 214 may display so as to visualize the segment classification of the customer, and may display so as to compare the aggregation results by the aggregation unit 213 among different segments. Further, the output unit 214 may display the counting result so as to compare the aggregation result with questionnaires having different conduction times. Here, displaying means to visualize the above-mentioned analysis result by, for example, displaying it on the display of an operator terminal 10 or printing it with a printer. The displaying may be performed according to a preset display item, or may be performed for an item instructed by the operator via the operator terminal 10.

Figure 7:
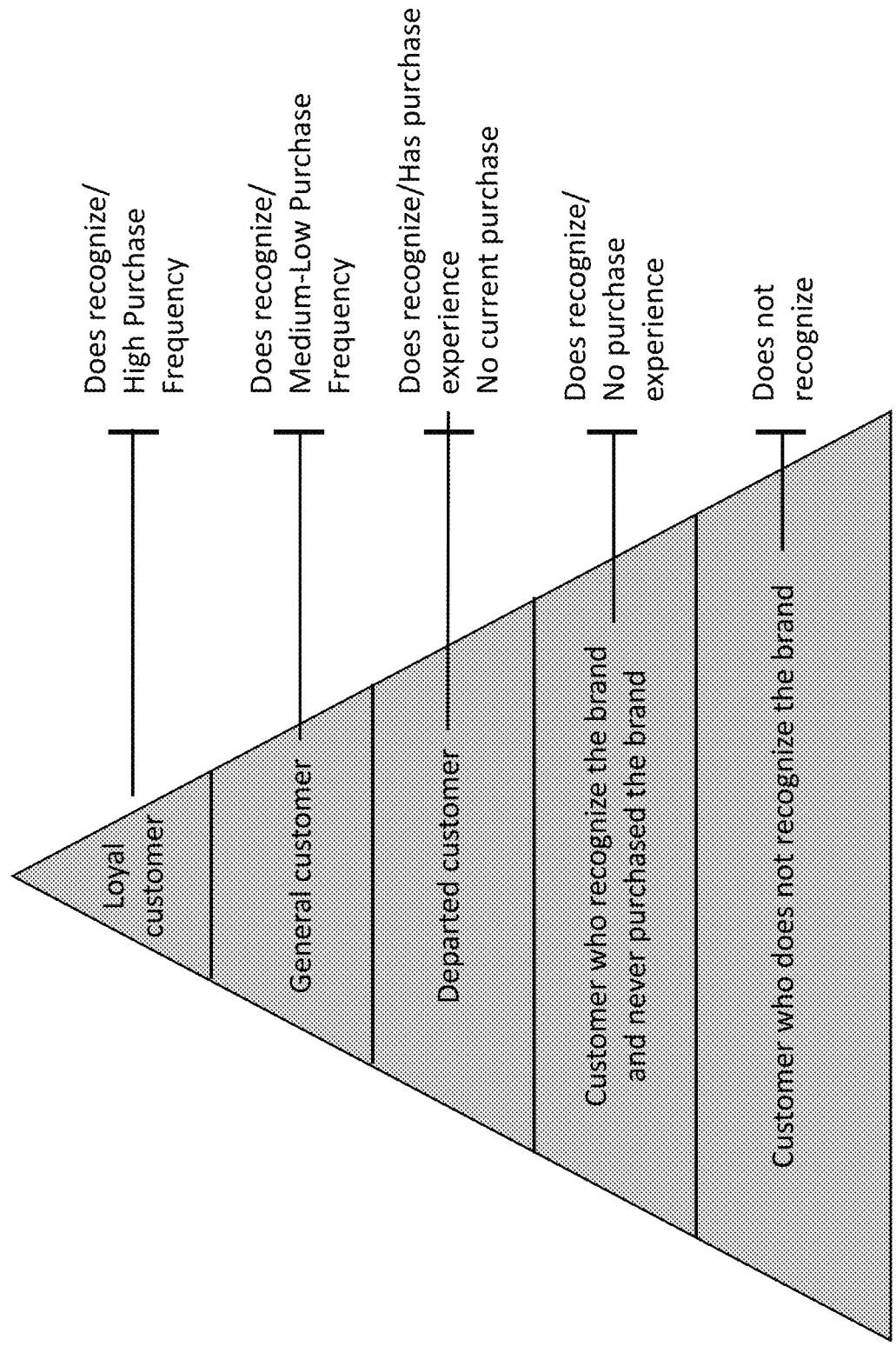
FIG. 7 shows an example of a screen illustrating a customer pyramid that classifies customers into five segments.

FIG. 7 shows an example of a screen illustrating a customer pyramid that classifies customers into five segments.

Here, the five segments consist of 1) a loyal customer, 2) a general customer, 3) a departed customer, 4) a customer who recognizes the brand and never purchased the brand, and 5) a customer who does not recognize the brand. These segments may be determined based on, for example, the questionnaire results shown in FIG. 4. It is possible to calculate the number of persons in the five segments by multiplying the ratio of customers (consumers) in each segment with the actual population (for example, the population of women in their twenties to forties) as a target market parameter based on the questionnaire results (in Japan, the population estimation by the Ministry of Internal Affairs and Communications).

Here, it is hypothesized that loyal customers account for 80% of total product sales, general customers account for the remaining 20%, particularly for products with a short purchasing cycle, and profits are concentrated in the top two segments. Therefore, sales can be calculated by calculating, based on the actual purchasing data of loyal customers and general customers, the average annual purchasing amount of each segment and multiplying it by the number of persons in each segment. Then, it is possible to calculate expenses and operating income for each of the five segments by approximating the investment costs for the top two segments and the bottom three segments. Although it is possible to generate sales and profit from the top two segments in the short term, in the medium to long term, there is a possibility that the other three lower segments may also move to the top segments. Not only the loyalizing of existing customers is needed, but also an overall investment is required for securing new customers.

FIG. 8A and FIG. 8B show examples of a screen displaying expenses for each customer segment.

First, as shown in FIG. 8A, when five segments are determined, the acquisition unit 211 of the marketing support system 20 receives cost input from an operator terminal 10 for policies such as, as a marketing policy for each segment, 1) a policy of further loyalization for loyal customers, 2) a policy of loyalization for general customers, 3) retargeting of departed customers to customers with purchase experiences, 4) retargeting of customers who recognize the brand and never purchased the brand to non-purchasers with recognitions. For example, a loyal customer program or CRM is a policy only for the top one or two groups, and assigns costs only to loyal customers or to loyal customers and general customers. If it is a specific targeting policy like a digital policy, the cost is assigned to each group.

As shown in FIG. 8B, when the aggregation unit 213 of the marketing support system 20 receives an input of the cost for each policy from an operator terminal 10, the costs are reflected in each cost item such as "A yen", "B yen", "C yen", and "D yen". The output unit 214 performs a process of generating a display. This allows the operator to see at a glance the costs for the policies planned for each segment. For example, since A yen is a cost for loyal customers, it can be understood that it that the entire amount of the loyalization policy is an investment assigned to loyal customers.

Furthermore, as shown in FIG. 8B, the output unit 214 of the marketing support system 20 displays a mass advertisement, introduced across segments, such as a television advertisement, or an item of a sales promotion (PR) policy. Furthermore, the marketing support system 20 displays the ratio of the number of customers (the number of consumers) in each segment, and displays the cost for the mass advertisement multiplied by the ratio by segment so that the operator can understand the cost by segment. For example, it can be understood that E yen is the cost assigned to all segments, (E×1%) yen is the investment applied to loyal customers, and (E×60%) yen is the cost applied to customers who do not recognize the brand. Also, the marketing support system 20 displays the item of the total amount, so that the operator can understand the total investment amount (cost) assigned to the loyal customer as A yen+(E yen×1%)+(F yen×1%), and can understand the total investment amount to customers who do not recognize the brand as (E yen× 60%)+(F yen×60%).

Further, although the examples shown in FIG. 8A and FIG. 8B focus on the cost invested in each customer segment, as another example, for human resources (for example, head count) assigned to policies for each customer segment, input may be received and displayed in the same manner and form.

FIG. 9 shows an example of the overlap analysis screen of customer brand of one's own brand and a competitor's brand.

When generating the customer pyramid shown in FIG. 7, customers of one's own brand and competing brands can be assigned from the questionnaire results, and the degree of duplication of customers of one's own brand and competitor's brand can be visualized and analyzed (overlap analysis). This allows operators to see the strengths and weaknesses of competing brands.

As shown in FIG. 9, the overlap analysis screen displayed by the output unit 214 of the marketing support system 20 is configured as a matrix diagram in which the customer pyramid (five segments) of one's own brand and the competitor's brand are compared based on the number of persons. For example, according to the screen shown in FIG. 9, there are 10 loyal customers of the competitor's brand from the general customers of one's own brand, and it is possible to focus on this segment and deepen the analysis of each customer on how the customer distinguishes brands (behavior attribute), why the customer distinguishes the brands (psychological attribute), and how the customer recognizes each brand. Then, based on this, ideas for acquiring loyal customers from competitors and ideas for not losing loyal customers in competition are reviewed and strategies are built. In another example, in the case where 59 loyal customers of application A overlap with 9 departed customers of application B, the analysis of why they switched from application B to application A is performed extensively while attempting interviews with each customer. Further, it can be a trigger for creating an idea for stealing a customer from application B.

In addition, for both one's own brand and the competitor brand, the departed layer is a layer which could be new customers therefrom for both brands and in the vertical axis and horizontal axis of FIG. 9, a total of five segments in which the departed customer is related to are correspondents, and segments where customers recognize either brand and have no user experiences of either brand corresponds to a total of three segments wherein the vertical axis and horizontal axis relates to customers who recognize the brand and never used the brand. In addition, a segment for customers who do not recognize both brands exists at a lower right side, By further exploring the attributes such as age, gender, behavior, psychological attributes and so on of potential customers in these layers by the operator, users can be grown into customers of higher segments.

Figure 10:
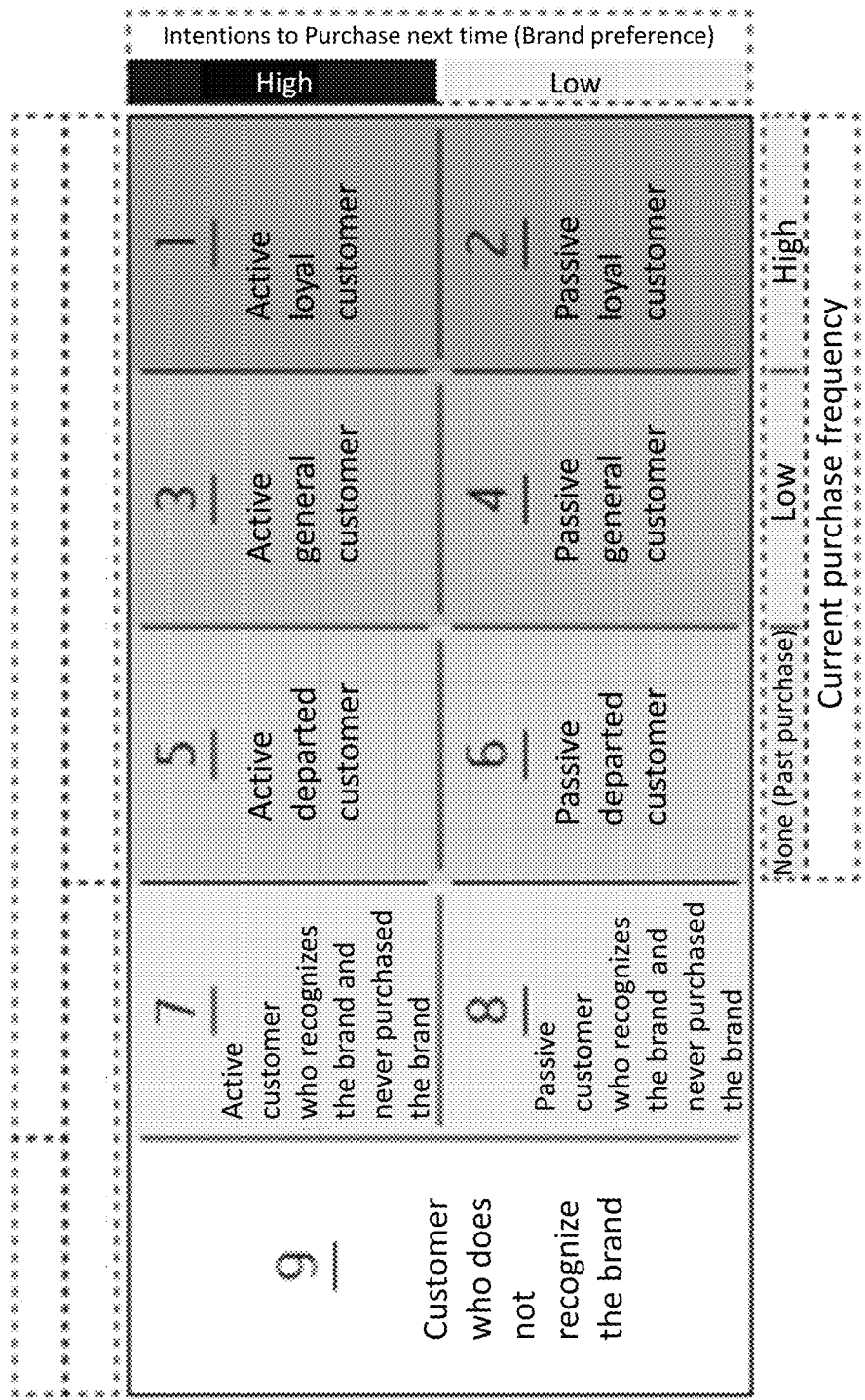
FIG. 10 is a diagram illustrating a segment map that classifies customers into nine segments.

FIG. 10 is a diagram illustrating a segment map that classifies customers into nine segments.

Nine segments (also referred to as 9 Segmap (trademark)) shown in FIG. 10 are configured to have segments in which four higher segments of the five segments defined in FIG. 7 are classified into two kinds depending on brand preference and an additional segment of a customer who does not recognize the brand, to have a total of nine segments. Here, brand preference means the intention of a purchaser to purchase or use the brand next time, and the respondent may be classified into nine segments by respondent inquiries about the recognition of the brand, the presence/absence of the purchase (use) frequency, and the frequency of the purchase (use) and responses to the inquiries.

As shown in FIG. 10, according to purchase intentions, loyal customers are classified into 1) active loyal customers and 2) passive loyal customers, and general customers are classified into 3) active general customers and 4) passive loyal customers, and departed customers are classified as 5) active departed customers and 6) passive departed customers, and customers who recognize the brand and never purchased the brand are classified as 7) active customers who recognize the brand and never purchased the brand and 8) passive customers who recognize the brand and never purchased the brand. For example, while active loyal customers buy (use) a large amount of products and have high loyalty and the risk of losing them as customers is low, passive loyal customers purchase (use) large amounts of products but have low loyalty and the risk of losing them as customers is high. In addition, active general customers are those with a small amount of purchase but high loyalty. If it is possible to find out the reasons for not purchasing in large quantities, such as, they are loyal customers of competitors' brands, they are out of sales network reach or have little exposure within stores and therefore it is difficult for them to purchase the brand, they are satisfied with the benefits of the product but they do not understand or recognize the uniqueness that leads to loyalty and that makes the price feel reasonable, and such, and if solutions can be suggested, this is a group highly likely to become active loyal customers. On the other hand, passive general customers are transient customers with a low amount of purchase and low loyalty, high possibility of breaking away, and it is said that most products have such customer bases.

As shown in FIG. 10, from the right side of the horizontal axis of the nine segment maps, segments of loyal customers, general customers, customers who recognize the brand and never purchased the brand, and customers who do not recognize the brand are arranged, and the segments classified as having brand preference is on the top of the vertical axis, and segments classified as having no brand preference are placed below. As described above, each segment can calculate the estimated number of persons by multiplying the ratio of the respondents classified in the questionnaire results by the population estimation. By tracking and displaying the numbers chronologically, it becomes possible to grasp the investment effect on the policies for each segment. In addition, it is possible to compare and display the chronological change in the number of customers and the ratio of the number of persons by segment between one's own brand and the competitor's brand. Here, the operator compares the processing results of the marketing support system 20 among the segments, and by deeply analyzing the age, behavior, and psychological attributes of each customer for each segment, the operator can find out the gap separating the segments, and the gap can assist qualitative research for an in-depth analysis of the gap. For example, it is assumed that there is an analysis result that there is a difference of age and a difference of "reliability" between active loyal users and passive loyal users. In this case, it can be hypothesized that communication is biased to a specific age group or that communication is performed only to a specific age group. Therefore, the hypothesis can be confirmed by comparing respective media contact rates and performing a concept test on each segment. Alternatively, it is possible to dig the analysis deeper and perform a more specific hypothesis setting. There is a great convenience of the present embodiment in utilizing such analysis and creating a hypothesis easily.

Also, as shown in FIG. 10, the change from the left to the right of the horizontal axis is regarded as the change in the purchase frequency from low to high, that is, the effect of sales promotion. A change from a downward direction to an upward direction on the vertical axis is considered as a change from low to high in brand preference, that is, an effect of branding. For example, the transition of the customer in the upper right direction can be visually understood as having realized both the promotion effect and the branding effect. Through this framework, it is possible to visualize and quantify sale promoting changes such as customer expansion and sales expansion along the same line as branding changes such as customer loyalty establishment, enabling integrated marketing analysis, which could not conventionally be viewed in an integrated manner. This segment map enables integrated analysis of investment in sales promotion and branding establishment by analyzing individual customers in each segment and performing strategy construction and potential evaluation.

For example, the number of customers of each of the nine segments of application A and the ratio of the number of persons thereof are compared with the number of customers of each of the nine segments of application B and the ratio of the number of persons thereof at different times (for example, one year ago and present) to enable confirmation of the change in the number of customers on the sales promotion axis (active loyal+passive loyal+active general+ passive general) and the change in the number of customers on the branding axis (active loyal+active general+active departed+active customers who recognize the brand and never purchased the brand). Also, by comparison, the total number of customers (total number of installations) to be acquired by the next branding policy (for example, TV advertisements) or sales promotion policy (on-line advertisements) and the overall marketing cost are designed and operated so as to meet the investment constraints (for example, the Life Time Value (LTV) obtained from one customer during a certain period).

Referring to FIG. 11, a process related to the policy plan of the marketing support system 20 will be described. First, in step S301, the acquisition unit 211 of the marketing support system 20 acquires, from the questionnaire system 30, questionnaire information including a response result of a questionnaire and an attribute of a respondent. For example, the acquisition unit 211 acquires the response result of the questionnaire as shown in FIG. 4 implemented by the questionnaire system 30.

Next, in step S302, the assignment unit 212 assigns each respondent to any of a plurality of segments set in advance.

Then, in step S303, the aggregation unit 213 aggregates, for each segment, the corresponding respondents for each attribute set in advance or instructed by the operator. Here, for example, the aggregation unit 213 multiplies the ratio of respondents for each segment by the actual population (for example, the population of women in their 20s to 40s) as the target market parameter (in Japan, the population estimation by the Ministry of Internal Affairs and Communications) thereby it is possible to calculate the number of persons (number of consumers) for each of the five segments.

Next, in step S304, the acquisition unit 211 receives a policy for each segment from the operator. For example, as shown in FIG. BA, the acquisition unit 211 may receive inputs of policies such as a marketing policy for each of the five segments, 1) a policy of further loyalization for loyal customers, 2) a policy of loyalization for general customers, 3) retargeting of departed customers to customers with purchase experiences, 4) retargeting of customers who recognize the brand and never purchased the brand to non-purchasers with recognitions, from an operator terminal 10. Furthermore, policies such as a policy of mass advertising and a sales promotion (PR) policy can also be accepted as a transversal policy for all segments. Here, the marketing support system 20 can store advance the policies for each segment corresponding with each segment. In addition, a mass advertising policy and a sales promotion (PR) policy can also be stored as policies corresponding to all segments.

Next, in step S305, the acquisition unit 211 receives, from the operator, an input of the cost for the measure for each segment. For example, as shown in FIG. 8B, with relation to 1) a policy of further loyalization for loyal customers, 2) a policy of loyalization for general customer, 3) retargeting of departed customers to customers with purchase experiences, 4) retargeting of customers who recognize the brand and never purchased the brand to non-purchasers with recognitions and the like, as marketing policies for each of the five segments, each receives input of an amount of money, A yen, B yen, C yen, D yen and so on, and in the case where an additional mass advertising policy or a sales promotion policy exist, an amount of money of E yen, F yen and so on are input.

Next, in step S306, the output unit 214 outputs the input expense according to a preset format (for example, the display format shown in FIG. 8A and FIG. 8B) or a format instructed by an operator. Here, the aggregation unit 213 performs, for example, a process of inputting an amount of money to a predetermined item of each segment with respect to the input expense in FIG. 8B. For example, if an input of the cost of A yen is received for the policy for loyal customers (policy for further loyalization), the aggregation unit 213 stores the process of corresponding the "A yen" with the item of the loyal customer. In addition, if an input of the cost of E yen is received for the mass advertising policy common to all segments, the aggregation unit 213 performs, for example, a process of calculating and storing an amount of money obtained by multiplying the percentage of the number of loyal customers 1% with respect to E yen (E yen×1%). Further, here, in the case where there is a significant difference in cost among the segments, the output unit 214 can also highlight the corresponding items by, for example, coloring or bold writing.

In this way, the user is able to confirm the cost invested in the policies planned for each customer segment (in the case of human resources, the number of persons).

Referring to FIG. 12, the process related to the competitive analysis of the marketing support system 20 will be described.

First, in step S401, the acquisition unit 211 of the marketing support system acquires, from the questionnaire system 30, questionnaire information including the response result of the questionnaire and the attribute of the respondent for one's own brand (brand A) and the competitor's brand (brand B). For example, the acquisition unit 211 acquires the response result of the questionnaire as shown in FIG. 4 implemented by the questionnaire system 30. Here, the questionnaire results include the results of respondents who responded to one's own brand and competitor's brand.

Next, in step S402, the assignment unit 212 assigns each respondent to any one of a plurality of segments set in advance for one's own brand and the competitor's brand.

Next, in step S403, the aggregation unit 213 aggregates the corresponding respondents for each attribute set in advance or instructed by the operator, for each segment of one's own brand and the competing brand. Here, for example, the aggregation unit 213 multiplies the ratio of respondents for each segment by the actual population (for example, the population of women in their 20s to 40s) as the target market parameter (in Japan, the population estimation by the Ministry of Internal Affairs and Communications) thereby it is possible to calculate the number of persons (number of consumers) for each of the five segments.

Then, in step S404, the output unit 214 outputs the number of respondents (the number of consumers) or the ratio thereof aggregated for each segment of one's own brand and the competitor's brand in a preset format (for example, the display format shown in FIG. 9) or according to a format instructed by an operator. Here, as shown in FIG. 9, the aggregation unit 213 aggregates the number of persons or the ratio so that it can be identified to which segment of the competitor's brand the customer of a specific segment of one's own brand is classified into, and the degree of duplication thereof. In addition, here, the output unit 214 may highlight and display items of one or more segments with coloring, bold writing, etc., or highlight and display items of a segment to be noted according to the selection of an operator. For example, when the operator makes an input to select a loyal customer of one's own brand, the output unit 214 can highlight and display a plurality of segments of the competitor's brand (to which the loyal customer belongs). In addition, the output unit 214 highlights and displays, for example, a total of five segments related to the departed customers on the vertical axis and the horizontal axis in FIG. 9, or highlights and displays a total of three segments in different colors, the segments related to the customers who recognize the brand and never purchased the brand on the vertical axis and the horizontal axis.

This allows operators to easily perform an overlap analysis of the customer segments of one's own brand and a competitor's brand.

As mentioned above, although this embodiment was described, the said embodiment is for making an understanding of this invention easy, and is not for limiting the interpretation of this invention. The present invention can be modified or improved without departing from the gist thereof, and the present invention also includes the equivalents thereof.

DESCRIPTION OF REFERENCE NUMERALS

10 Operator terminal
20 Marketing Support System
30 Questionnaire System
211 Acquisition Unit
212 Assignment Unit
213 Aggregation Unit
214 Output Unit

The invention claimed is:
1. A marketing support system comprising,
an acquisition unit acquiring, using a processor, questionnaire information comprising a response result of a questionnaire and an attribute of a respondent of the questionnaire from the respondent through a communication interface connected to a communication network, the questionnaire conducted to consumers in a product and service field to which a marketing target belongs, based on recognition, usage experience, and frequency of use of a brand belonging to the field;
an assignment unit for assigning, using a processor, the respondent to one of a plurality of segments based on the response result, the plurality of segments being set in advance based at least on the frequency of use of the brand;

an aggregation unit configured to aggregate attributes of respondents assigned to each of the plurality of segments and estimate, using a processor, the number of respective consumers of the plurality of segments and a ratio of the number of consumers corresponding to each of the plurality of segments to the number of all customers based on a ratio of respondents assigned to each of the plurality of segments to the number of all respondents; and an output unit configured to visualize, on a display, a policy for the respective consumers of the plurality of segments, information on costs for the policy, information on costs for mass advertisements for the respective customers of the plurality of segments, and information on costs on sales promotion for the respective customers of the plurality of segments for comparison among different segments, wherein the plurality of segments comprise a loyal customer, a general customer, a departed customer, a customer who recognizes the brand and has never purchased the brand, and a customer who does not recognize the brand, according to customer experience, the policy for the respective consumers of the plurality of segments is a policy only applicable for the respective consumers of the plurality of segments, a policy for mass advertisement and a policy for sales promotion each are a policy commonly applicable for the respective customers of the plurality of segments, and the costs for mass advertisement and the costs for sales promotion are calculated based on costs of mass advertisement and costs for sales promotion for each of the plurality of segments, and the ratio of the number of the customers, wherein when there is a given difference between cost items for the plurality of segments, the display highlights the cost items with coloring, bold-writing, or both in order to make the cost items notable, wherein the output unit further highlights the other segments of the brand related to the departed customer, and wherein the output unit further highlights three segments of the brand in different colors, the three segments of each of the brand including the departed customer, the customer who recognizes the brand and has never purchased the brand, and the customer who does not recognize the brand.

2. A marketing support system comprising, an acquisition unit acquiring, using a processor, questionnaire information comprising a response result of a questionnaire and an attribute of a respondent of the questionnaire from the respondent through a communication interface connected to a communication network, the questionnaire conducted to consumers in a product and service field to which a marketing target belongs, based on recognition, usage experience, and frequency of use of a first brand and a second brand belonging to the field, the second brand being a competitor's brand of the first brand;

an assignment unit for assigning, using a processor, the respondent to one of a plurality of segments based on the response result, the plurality of segments being set in advance based at least on the frequency of use of the first brand and the second brand;

an aggregation unit configured to, using a processor, aggregate attributes of respondents assigned to each of the plurality of segments and estimate the number of respective consumers of the plurality of segments and a ratio of the number of consumers corresponding to each of the plurality of segments to the number of all customers based on a ratio of respondents assigned to each of the plurality of segments to the number of all respondents; and an output unit configured to visualize, on a display, the number of consumers and the ratio of the number of consumers corresponding to each of the plurality of segments to the number of all customers in a matrix form so as to compare the first brand and the second brand and to compare between different segments, wherein the plurality of segments comprise, for each of the first brand and the second brand, a loyal customer, a general customer, a departed customer, a customer who recognizes the brand and has never purchased the brand, and a customer who does not recognize the brand, according to customer experience, wherein the output unit is configured to display which of the plurality of segments of the second brand the respective customers of the plurality of segments of the first brand are assigned to, and is configured to display the plurality of segments to distinguish one or more segments related to respective departed customers of the first brand and the second brand from the other segments, wherein when an operator makes an input to select the loyal customer of the first brand, the output unit highlights, on the matrix form, the plurality of segments of the second brand, to which the loyal customer of the first brand correspond, with coloring, bold-writing, or both, wherein the output unit further highlights the other segments of the first or second brand related to the departed customer of the second or first brand, respectively, on the matrix form, and wherein the output unit further highlights, on the matrix form, three segments of the first and second brands in different colors, the three segments of each of the first and second brands including the departed customer, the customer who recognizes the brand and has never purchased the brand, and the customer who does not recognize the brand.

* * * * *